United States Patent
Umamaheswaran et al.

(10) Patent No.: US 9,092,603 B2
(45) Date of Patent: *Jul. 28, 2015

(54) CREATING FEDERATED CUSTOMER IDENTIFIERS TO POSITIVELY IDENTIFY CUSTOMERS INTERFACING WITH A BUSINESS ACROSS ACCESS PLATFORMS

(75) Inventors: Rangarajan Umamaheswaran, Simi Valley, CA (US); Bruce Wyatt Englar, Ventura, CA (US); Brett A. Nielson, Spangle, WA (US); Miroslav Halas, Charlottesville, VA (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 129 days.

This patent is subject to a terminal disclaimer.

(21) Appl. No.: 13/468,820

(22) Filed: May 10, 2012

(65) Prior Publication Data

US 2013/0304661 A1 Nov. 14, 2013

(51) Int. Cl.
*G06Q 99/00* (2006.01)
*G06F 21/31* (2013.01)
*G06Q 40/02* (2012.01)

(52) U.S. Cl.
CPC .............. *G06F 21/316* (2013.01); *G06Q 40/02* (2013.01)

(58) Field of Classification Search
USPC .......................................... 705/1.1, 325, 500
See application file for complete search history.

(56) References Cited

U.S. PATENT DOCUMENTS

| | | | |
|---|---|---|---|
| 7,676,829 B1 * | 3/2010 | Gui et al. ........................ | 726/5 |
| 7,680,819 B1 * | 3/2010 | Mellmer et al. .............. | 707/783 |
| 2002/0065919 A1 * | 5/2002 | Taylor et al. .................. | 709/226 |
| 2004/0098619 A1 * | 5/2004 | Shay .............................. | 713/201 |
| 2004/0186882 A1 * | 9/2004 | Ting .............................. | 709/202 |
| 2005/0165643 A1 * | 7/2005 | Wilson et al. .................. | 705/14 |
| 2008/0109307 A1 * | 5/2008 | Ullah ............................. | 705/14 |
| 2008/0168539 A1 * | 7/2008 | Stein ................................ | 726/5 |
| 2008/0201733 A1 * | 8/2008 | Ertugrul et al. ................ | 725/32 |
| 2008/0220760 A1 * | 9/2008 | Ullah ............................. | 455/420 |
| 2009/0249451 A1 * | 10/2009 | Su et al. ........................... | 726/5 |
| 2010/0063993 A1 * | 3/2010 | Higgins et al. ................ | 709/203 |
| 2010/0088372 A1 * | 4/2010 | Shridhar et al. ............. | 709/204 |
| 2010/0312820 A1 * | 12/2010 | Goffinet et al. .............. | 709/203 |
| 2011/0047072 A1 * | 2/2011 | Ciurea .......................... | 705/39 |
| 2011/0093327 A1 * | 4/2011 | Fordyce et al. ............ | 705/14.39 |
| 2011/0276627 A1 * | 11/2011 | Blechar et al. ................ | 709/203 |
| 2011/0313847 A1 * | 12/2011 | Cao et al. .................... | 705/14.43 |
| 2011/0321156 A1 * | 12/2011 | Smith ............................ | 726/19 |
| 2012/0109734 A1 * | 5/2012 | Fordyce et al. ............ | 705/14.25 |

(Continued)

*Primary Examiner* — Lynda Jasmin
*Assistant Examiner* — Michael Thompson
(74) *Attorney, Agent, or Firm* — Michael A. Springs; Moore & Van Allen PLLC; James C. Edwards

(57) ABSTRACT

Methods, apparatus, systems and computer program products described and claimed that provide for automatically and positively determining that a customer interfacing with one business platform application using a platform-specific customer identifier is the same customer that is interfacing with another business platform application using another platform-specific customer identifier. Once the positive determination of same customer is made, a federated identifier key is generated and applied to all of the platforms, so as to globally identify the customer across multiple enterprise-wide platforms. As such, the present invention eliminates the labor-intensive need to manually analyze customer data to determine if a customer interfacing with one platform is the same customer interfacing with another platform.

18 Claims, 6 Drawing Sheets

(56) References Cited

U.S. PATENT DOCUMENTS

| | | | |
|---|---|---|---|
| 2012/0109882 A1* | 5/2012 | Bouse et al. | 707/607 |
| 2012/0215640 A1* | 8/2012 | Ramer et al. | 705/14.55 |
| 2012/0310829 A1* | 12/2012 | Paulsen et al. | 705/44 |
| 2013/0124315 A1* | 5/2013 | Doughty et al. | 705/14.53 |
| 2013/0124324 A1* | 5/2013 | Doughty et al. | 705/14.58 |
| 2013/0124327 A1* | 5/2013 | Doughty et al. | 705/14.64 |
| 2013/0124329 A1* | 5/2013 | Tengler | 705/14.66 |
| 2013/0124331 A1* | 5/2013 | Doughty et al. | 705/14.66 |
| 2013/0124332 A1* | 5/2013 | Doughty et al. | 705/14.66 |
| 2013/0124333 A1* | 5/2013 | Doughty et al. | 705/14.66 |

* cited by examiner

CREATING FEDERATED CUSTOMER IDENTIFIERS TO POSITIVELY IDENTIFY CUSTOMERS INTERFACING WITH A BUSINESS ACROSS ACCESS PLATFORMS

FIELD

In general embodiments herein disclosed relate to computer data processing and, more specifically automated means for positively identifying customers interfacing with a business across multiple platforms.

BACKGROUND

Many business entities, such as financial institutions or the like, implement a multitude of business platforms and each of the business platforms may require that a customer log-in as a means of identifying themselves as an authorized user of the business platform. However, in many instances the business platforms are configured to allow the customer to identify themselves using platform-specific customer identifiers. For example, in the financial institution scenario, a customer may log-in with a social security number for an interactive voice response (IVR) platform, and the same customer may log-in to an online banking platform using an online banking identifier (e.g., user name or the like). Moreover, the same customer may have many other identifiers specific to the platforms they interface with.

The use of multiple customer identifiers becomes problematic when trying to determine if a customer interfacing with one platform using one identifier is the same customer accessing another platform using another identifier. Such a need to determine customer identity, and moreover determine identity positively, meaning without reasonable doubt, is especially relevant in financial institution, which track/monitor customer activity as a means of uncovering suspicious activity. However, if the customer tracking/monitoring system is unable to determine that a customer interfacing with one platform is the same customer interfacing with another platform, the resulting monitoring results will invariably be incomplete and inaccurate.

In current practice, much manual intervention is needed to positively identify that a customer interfacing with one platform using a first identifier is the same customer that is interfacing with a second platform using a second identifier. This is because the customer data tied to the platform-defined customer identifier (i.e., data stored in the customer's system of record (SOR) associated with that particular platform) is typically incomplete, outdated, inaccurate and/or otherwise not prone to correlation due to system configurations, data field lengths and the like. As such, analysts must painstakingly analyze data within different system of records before a customer can be positively identified as the same customer interfacing with two separate platforms using separate platform-specific customer identifiers.

Therefore, a need exists to create an automated system for positively identifying that a customer interfacing with one platform via a platform-specific customer identifier is the same customer that interfaces with another platform using another application-specific identifier. Based on such a determination a world-wide customer federated identifier may be automatically generated. The federated identifier may be applied to all of the platforms across the enterprise, so as to positively identify the customer regardless of the identifier they use for interfacing with any platform associated with the business entity.

SUMMARY

The following presents a simplified summary of one or more embodiments in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments in a simplified form as a prelude to the more detailed description that is presented later.

Methods, apparatus, systems and computer program products are described herein that provide for positively identifying a customer having multiple platform-specific identifiers for interfacing with multiple platforms within a business entity. Once a determination is made that a customer is the same customer interfacing with separate platforms a federated identifier may be generated for the customer and applied across most, if not all, of the other existing platforms within the entity. The federated identifier/key provides for the customer to be positively identified regardless of which identifier they use to interface with a platform. As such, the present invention eliminates the need for an analyst to manually determine if a customer interfacing with one platform using a platform-specific customer identifier is, in fact, the same customer accessing another platform using another platform-specific customer identifier.

A method for positively identifying customers accessing a business through multiple business platform applications using different customer identifiers, defines first embodiments of the invention. The method includes determining that a customer interfacing with a first business platform application using a first platform-specific customer identifier is a same customer as a customer interfacing with a second business platform application when using a second different platform-specific customer identifier. The method further includes generating a different and unique federated identifier for the customer based on the determination that the customer interfacing with the first business platform application is the same customer interfacing with the second business platform application and storing the federated identifier for the customer in a plurality of systems of record. Each system of record is associated with the customer and a business platform application provided by the business.

In specific embodiments the method additionally includes collecting customer activity data from a plurality of business interface platforms. Each customer activity datum indicates that a customer has conducted an activity with one of a plurality of business platform applications and includes a platform-specific customer identifier associated with the customer and used to conduct the activity. In such embodiments of the method, the platform-specific customer identifiers in the customer activity data may form the basis for determining that the customer interfacing with the first business platform application is the same customer interfacing with the second business platform application.

In other specific embodiments of the method, determining further includes identifying linking data that links the first platform-specific customer identifier and the second platform-specific customer identifier and accessing one or more systems of record associated with business platform applications based on the linking data to determine that that the customer interfacing with the first business platform application is the same customer interfacing with the second business platform application.

In still further specific embodiments of the method, determining further includes accessing both a first and second system of record associated, respectively, with the first and second business platform applications based on the first and second platform-specific customer identifiers. The first system of record includes first data items associated with the customer and the second system of record includes second data items associated with the customer. In addition, identifying one or more data item matches between the first data items in the first system of record and the second data items in the second system of record, wherein data item matches include same or similar data. In such embodiments the method further includes applying a weighting factor to each of the one or more data item matches. The weighting factor is based on similarity of the data and a significance that the data item match may indicate that the customer interfacing with the first business platform application is the same customer interfacing with the second business platform application. Further, such embodiments of the method may include calculating the weighted one or more data item matches and comparing a calculated total for the weighted one or more data item matches to a predetermined threshold to determine if the customer interfacing with the first business platform application is the same customer interfacing with the second business platform application.

In other alternate embodiments the method includes implementing the federated identifier to access the plurality of systems of record to determine a plurality of platform-specific customer identifiers associated with the customer. In such embodiments the method may further include identifying business associates that have previously interfaced with the customer or accounts associated with the customer based on the determined plurality of platform-specific customer identifiers.

An apparatus for positively identifying customers accessing a business through multiple business platform applications using different customer identifiers, provides for second embodiments of the invention. The apparatus includes a computing platform including one or more processors and a memory in communication with the processor. The apparatus further includes a customer federation module stored in the memory and executable by at least one of the processors. The customer federation module is configured to determine that a customer interfacing with a first business platform application using a first platform-specific customer identifier is the same customer as a customer interfacing with a second business platform application when using a second different platform-specific customer identifier and, based on the determination, generate a different and unique federated identifier for the customer. Further, the apparatus includes a plurality of systems of record stored in the memory, such that each system of record is associated with the customer and with a business platform application provided by the business and configured to receive and store the federated identifier.

In specific embodiments the apparatus further includes an activity monitoring module stored in the memory, executable by the processor and configured to monitor and collect customer activity data from a plurality of business platform applications. Each customer activity datum indicates that a customer has conducted an activity with one of a plurality of business platform applications and includes a platform-specific customer identifier associated with the customer and used to conduct the activity. In such embodiments of the apparatus, the customer activity data collected by the activity monitoring module may be the impetus for determining that the customer interfacing with the first business platform application is the same customer interfacing with the second business platform application.

In other specific embodiments of the apparatus the customer federation module is further configured to identify linking data that links the first platform-specific customer identifier and the second platform-specific customer identifier. In addition, the module is configured to access one or more systems of record associated with business platform applications based on the linking data to determine that that the customer interfacing with the first business platform application is the same customer interfacing with the second business platform application.

In still further specific embodiments of the apparatus, the customer federation module is further configured to access a first and second system of record associated, respectively, with the first and second business platform applications based on the first and second platform-specific identifiers. The first system of record includes first data items associated with the customer and the second system of record includes second data items associated with the customer. The module is further configured to identify one or more data item matches between the first data items in the first system of record and the second data items in the second system of record, such that data item matches include same or similar data. In such embodiments of the apparatus, the customer federation module may be further configured to apply a weighting factor to each of the one or more data item matches. The weighting factor is based on similarity of the data and a significance that the data item match may indicate that the customer interfacing with the first business platform application is the same customer interfacing with the second business platform application. Further, the customer federation module is further configured to calculate the weighted one or more data item matches and compare a calculated total for the weighted one or more data item matches to a predetermined threshold to determine if the customer interfacing with the first business platform application is the same customer interfacing with the second business platform application.

In still further specific embodiments the apparatus includes an associate-customer connection module stored in the memory, executable by the processor and configured to implement the federated identifier to access the plurality of systems of record to determine a plurality of platform-specific customer identifiers associated with the customer. In addition, the associate-customer connection module is further configured to identify business associates that have previously interfaced with the customer or accounts associated with the customer based on the determined plurality of platform-specific customer identifiers.

A computer program product including a non-transitory computer-readable medium, defines third embodiments of the invention. The computer-readable medium includes a first set of codes for causing a computer to determine that a customer interfacing with a first business platform application using a first platform-specific customer identifier is the same customer as a customer interfacing with a second business platform application when using a second different platform-specific customer identifier. The computer program product additionally includes a second set of codes for causing a computer to generate a different and unique federated identifier for the customer based on the determination that the customer interfacing with the first business platform application is the same customer interfacing with the second business platform application. In addition, the computer program product includes a third set of codes for causing a computer to store the federated identifier for the customer in a plurality of systems of record, wherein each system of record is associated with the customer and a business platform application provided by the business.

Thus, embodiments of the invention are described in greater detail below that provide for positively determining that a customer interfacing with one business platform application using a platform-specific customer identifier is the same customer that is interfacing with another business platform application using another platform-specific customer identifier. Once the positive determination of same customer is made, a federated identifier key is generated and applied to all of the platforms in which the customer can be positively identified, so as to globally identify the customer across multiple enterprise-wide platforms. As such, the present invention eliminates the labor-intensive need to manually analyze customer data to determine if a customer interfacing with one platform is the same customer interfacing with another platform.

To the accomplishment of the foregoing and related ends, the one or more embodiments comprise the features hereinafter fully described and particularly pointed out in the claims. The following description and the annexed drawings set forth in detail certain illustrative features of the one or more embodiments. These features are indicative, however, of but a few of the various ways in which the principles of various embodiments may be employed, and this description is intended to include all such embodiments and their equivalents.

BRIEF DESCRIPTION OF THE DRAWINGS

Figure 1:
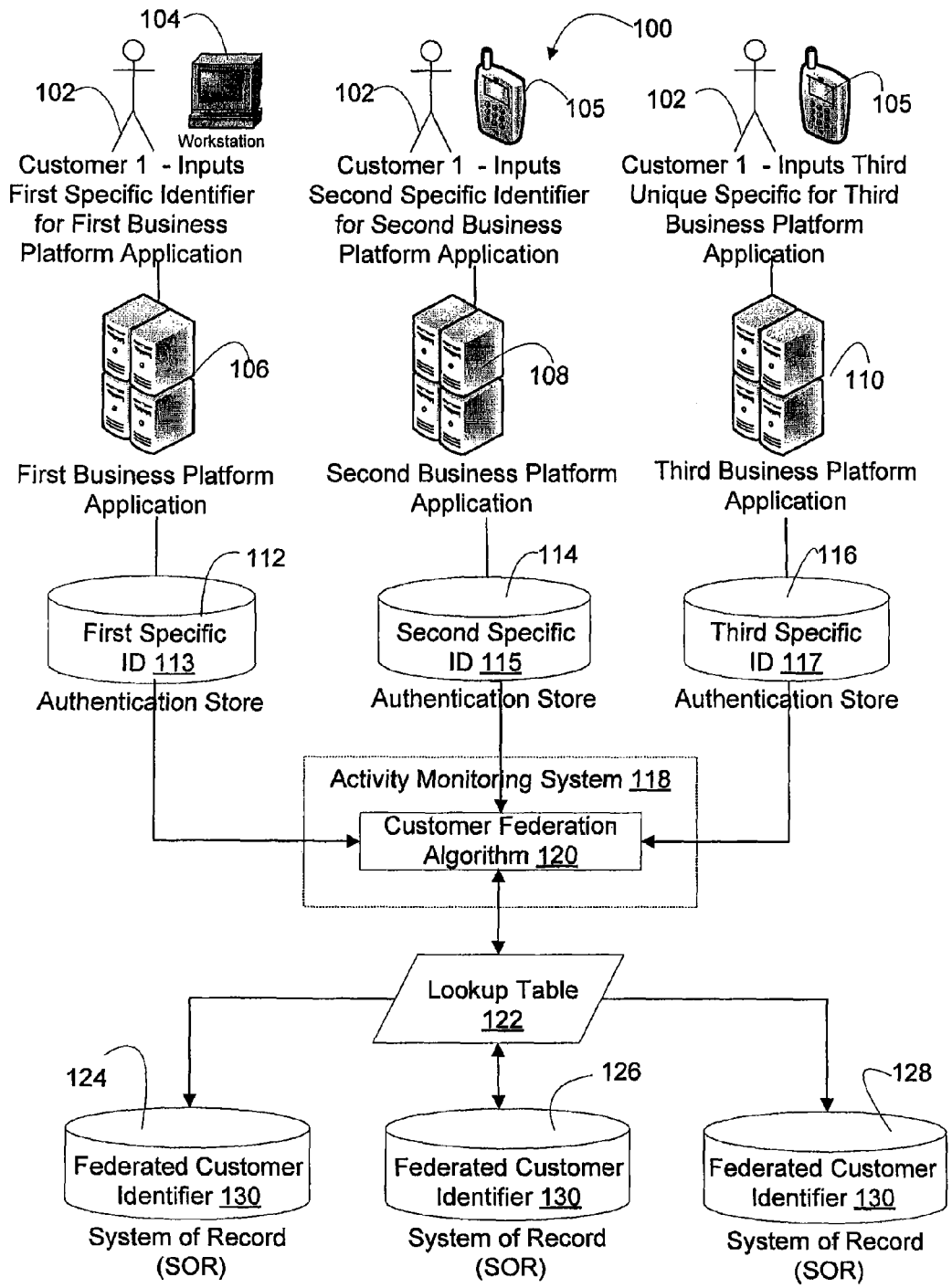
Figure 2:
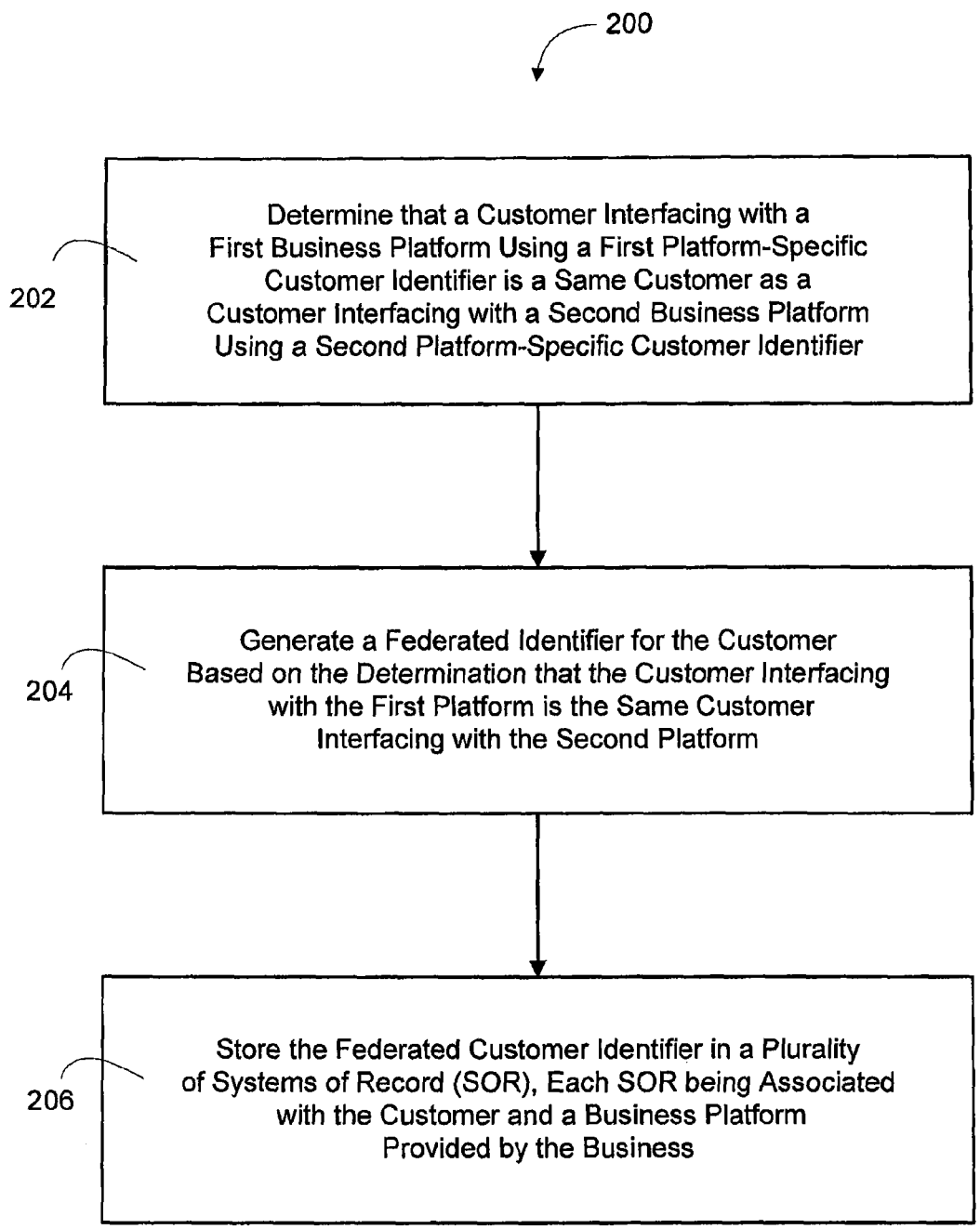
Figure 3:
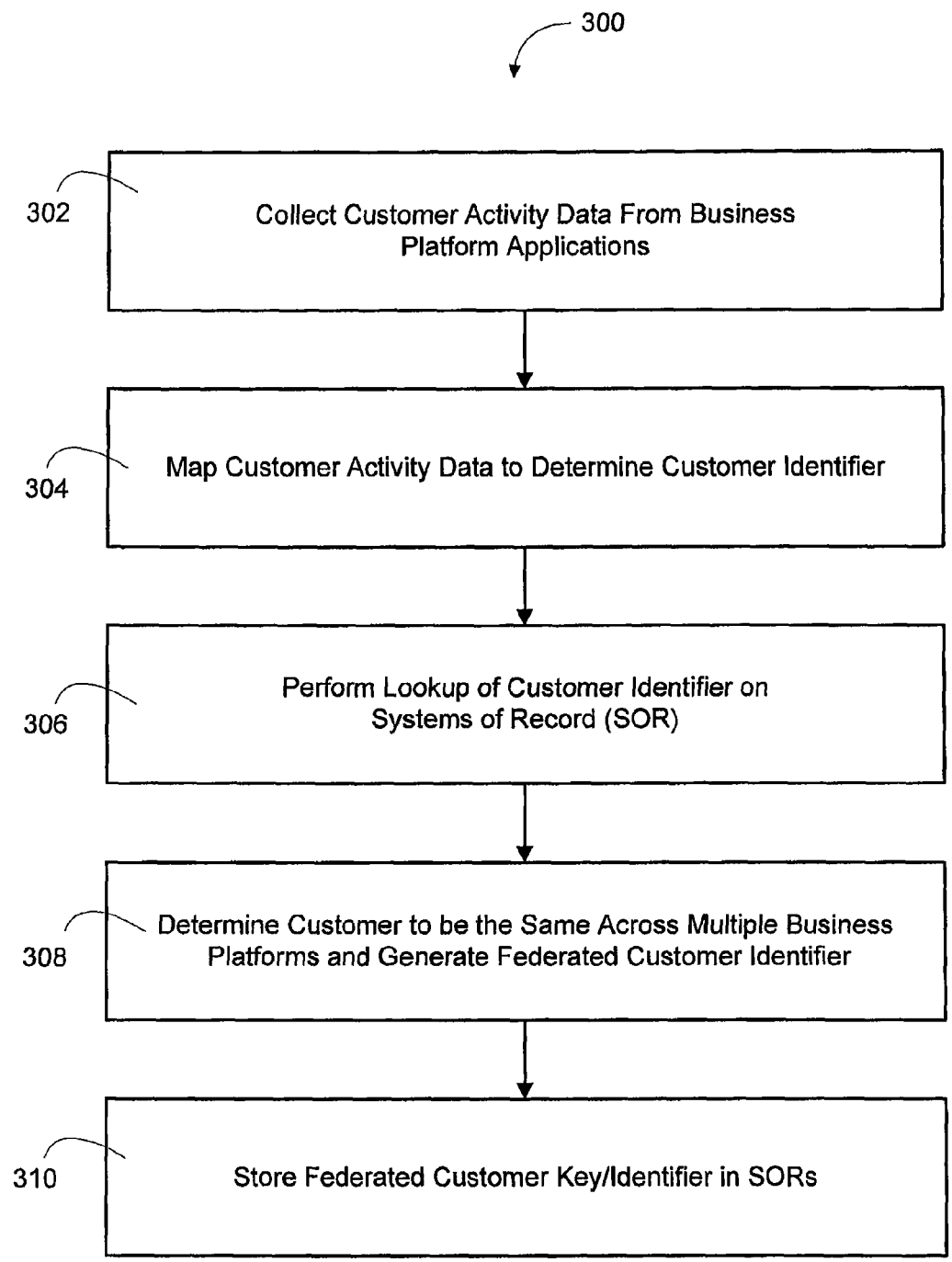
Figure 4:
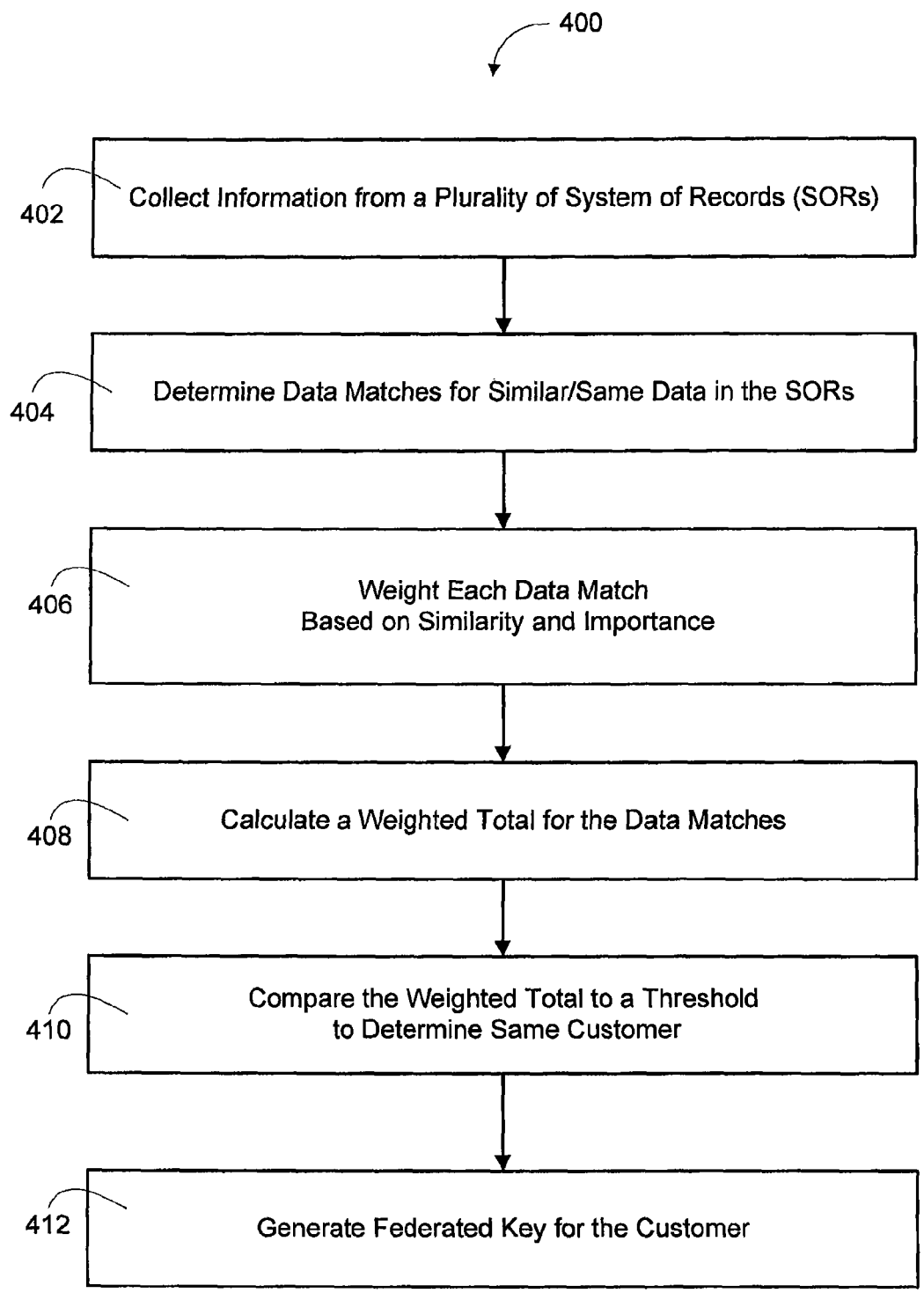
Figure 5:
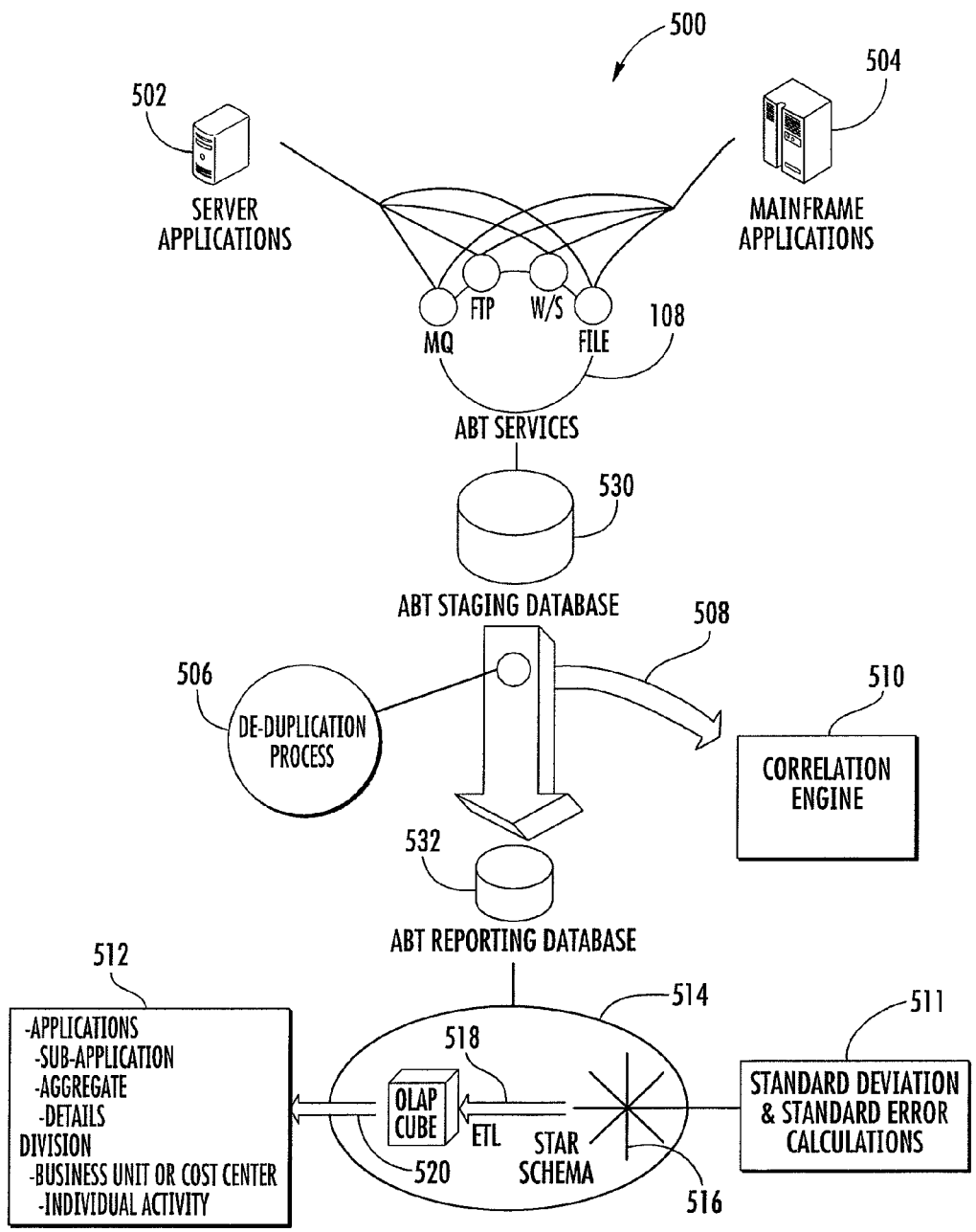
Figure 6:
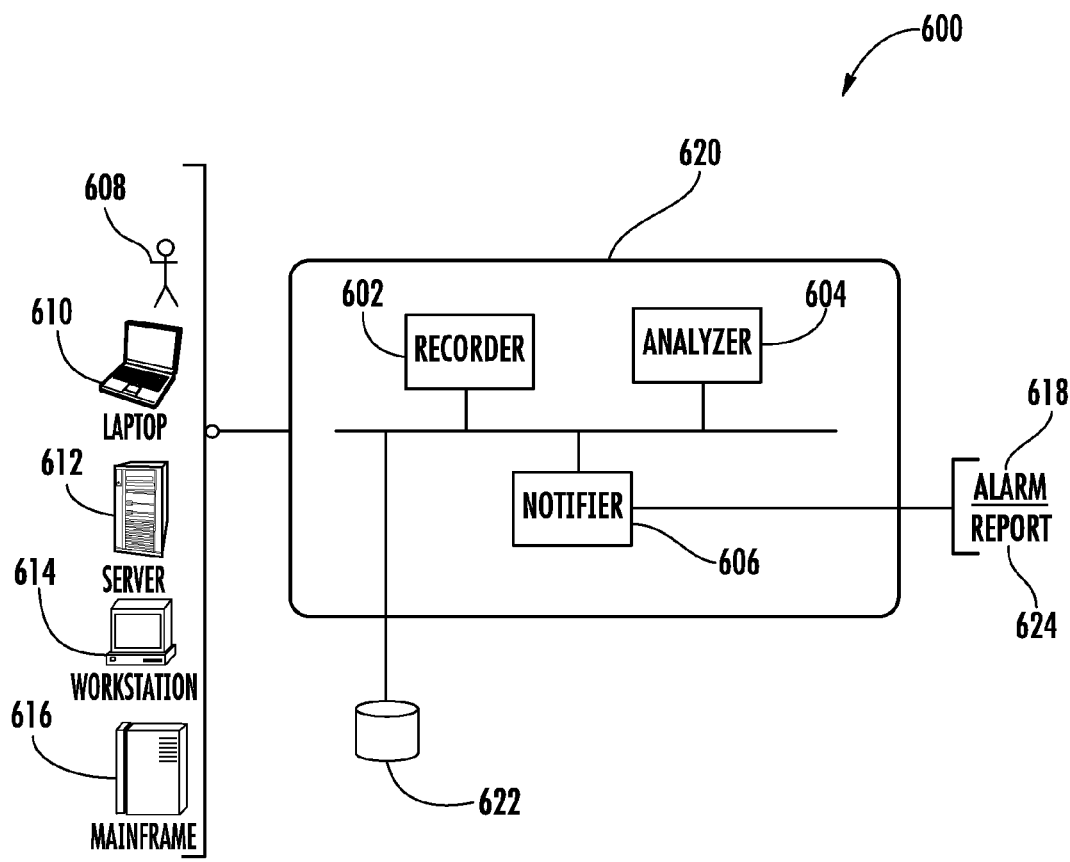

Having thus described embodiments of the invention in general terms, reference will now be made to the accompanying drawings, which are not necessarily drawn to scale, and wherein:

FIG. 1 is a block diagram of a system for positive identification of a customer in an activity monitoring system, in accordance with embodiments of the present invention;

FIG. 2 is a method for positively identifying a customer interfacing with different business platform applications with different customer identifiers, in accordance with embodiments of the present invention;

FIG. 3 is a method for generating federated customer identifiers, in accordance with embodiments of the present invention;

FIG. 4 is a method for determining that a customer interfacing with a first business platform application with a first platform-specific customer identifier is the same customer interfacing with a second business platform application with a second platform-specific customer identifier, in accordance with embodiments of the present invention;

FIG. 5 is schematic block diagram that illustrates architecture of a system for monitoring application-related and/or platform-related activity in a distributed computing network, in accordance with embodiments of the present invention; and FIG. 6 is a schematic diagram showing general operation of a system for monitoring application-related activity in a distributed computing network, in accordance with embodiments of the present invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. In the following description, for purposes of explanation, numerous specific details are set forth in order to provide a thorough understanding of one or more embodiments. It may be evident; however, that such embodiment(s) may be practiced without these specific details. Like numbers refer to like elements throughout.

Various embodiments or features will be presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches may also be used.

The steps and/or actions of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium may be coupled to the processor, such that the processor can read information from, and write information to, the storage medium. In the alternative, the storage medium may be integral to the processor. Further, in some embodiments, the processor and the storage medium may reside in an Application Specific Integrated Circuit (ASIC). In the alternative, the processor and the storage medium may reside as discrete components in a computing device. Additionally, in some embodiments, the events and/or actions of a method or algorithm may reside as one or any combination or set of codes and/or instructions on a machine-readable medium and/or computer-readable medium, which may be incorporated into a computer program product.

In one or more embodiments, the functions described may be implemented in hardware, software, firmware, or any combination thereof. If implemented in software, the functions may be stored or transmitted as one or more instructions or code on a computer-readable medium. Computer-readable media includes both computer storage media and communication media including any medium that facilitates transfer of a computer program from one place to another. A storage medium may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures, and that can be accessed by a computer. Also, any connection may be termed a computer-readable medium. For example, if software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. "Disk" and "disc", as used herein, include compact disc (CD), laser disc, optical disc, digital versatile disc (DVD), floppy disk and blu-ray disc where disks usually reproduce data magnetically, while discs usually reproduce data optically with lasers. Combinations of the above should also be included within the scope of computer-readable media.

Thus, methods, apparatus, systems, and computer program products are described herein that provide for positively identifying a customer that interfaces with a business platform application using an platform-specific identifier and interfaces with another platform using another platform-specific customer identifier. Based on the same customer determination a federated customer identifier is generated and is applied to all other platforms in which the customer can be positively identified. The federated identifier/key provides for the customer to be positively identified regardless of which identifier they use to access a platform. As such, the present invention eliminates the need for an analyst to manually determine if a customer interfacing with one platform using a platform-specific customer identifier is, in fact, the same customer interfacing with another platform using another platform-specific customer identifier.

Referring to FIG. 1, a system 100 is depicted for customer identity federation within a business entity, in accordance with embodiment of the present invention. A customer 102 interfaces with various business platform applications via various computing devices, such as workstation 104, mobile device 105 and the like. The business platform applications may include first business platform application 106, second business platform application 108 and third business platform application 110. Each of the business platform applications requires input of a customer identifier (e.g., user ID) to authenticate the customer 102 and provide the customer access to the platform. Thus, first business platform application 106 is in communication with authentication store 112 which stores first platform-specific customer identifier 113, second business platform application 108 is in communication with authentication store 114 which stores second platform-specific customer identifier 115 and third business platform application 108 is in communication with authentication store 116 which stores third platform-specific customer identifier 117.

According to embodiments of the present invention the customer identifiers may be specific or otherwise tied to the business platform application, such that the customer 102 may have many different customer identifiers which provide access to one or more associated business platform applications. For example, in a financial institution scenario, the first business platform application 106 may be an online banking platform application and the associated customer identifier 117 may be a unique online banking identifier. The second business platform application 108 may be an Interactive Voice Response (IVR) platform application and the associated customer identifier 112 may be at least a portion of a social security number, while the third business platform application 110 may be a human interaction call center platform and the associated customer identifier 115 may be an account number. The use of different customer identifiers within a business entity is typically due to many factors, such as the size of the enterprise, the number and variance in configuration of the business platform applications existing in the business entity, legacy platform applications acquired through mergers/acquisitions and the like.

System 100 may additionally include activity monitoring system 118, which is configured to monitor customer activity as it pertains to the various business platform applications. Monitoring of customer activity may be necessary to track the activities which a customer participates in and identify any activities which may be considered suspicious. An exemplary activity monitoring system 118 is described in more detail in relation to FIGS. 5 and 6. Activity monitoring system 118 may include customer federation module 120 which is configured to determine that a customer accessing a business platform application with a first platform-specific customer identifier is, in fact, the same customer that is accessing the business platform application with a second platform-specific customer identifier and generate a corresponding federated customer identifier 130 that is capable of positively identifying the customer across most, and in some embodiments all, of the business platform applications implemented by the business entity. While the customer federation module 120 is shown and described as being included within the activity monitoring system it should be noted that the customer federation module 120 may exist as a stand-alone module and be implemented in any instances in which a need exists to determine that a customer accessing a business domain application with a first platform-specific customer identifier is, in fact, the same customer that is accessing the business platform application with a second platform-specific customer identifier and generate a corresponding federated customer identifier.

In specific embodiments of the system 100 the activity monitoring system 118 collects activity-related data from the business applications, such as first, second and third business platform applications 106, 108 and 110 and the like. The customer federation module 120 may be configured to map the activity-related data for a given business platform application to determine the associated platform-specific customer identifier. The customer federation module 120 may further be configured to identify and isolate the platform-specific identifier(s). Once the platform-specific identifier has been identified, the customer federation module 120 may be configured to perform the lookup of the on the SORs, such as system of record (SOR) 124 associated with first business platform application 106, system of record (SOR) 126 associated with second business platform application 108 and system of record (SOR) 128 associated with third business platform application 110. In specific embodiments, the customer federation module 120 may determine the SOR(s) and sequence of lookups by accessing the optional lookup table 122.

Once the SOR(s) have been determined, the customer federation module 120 may further be configured to perform a sequence of lookups on the SORs. Further, the customer federation module 120 may be configured based on the lookup and algorithmic and/or heuristic computation to positively determine that the a customer interfacing with a business platform application with a first platform-specific customer identifier is, in fact, the same customer that is interfacing with the business platform application with a second platform-specific customer identifier. Once the determination of same customer has been made, a federated customer identifier 130 may be generated and applied (i.e., stored) to the various SORs associated with the customer and the business platform applications in which the customer has interfaced with or is otherwise authorized to interface with. In specific embodiments of the invention, the federated customer identifier 130 may be applied to all of the SORs associated with the customer and all of the business platform applications implemented by the business entity. In this regard, the federated customer identifier 130 serves as a universal identifier that can positively identify a customer across a global enterprise.

Referring to FIG. 2, a flow diagram of a method 200 for positively identifying customers interfacing with multiple business platform applications associated with a business entity using different customer identifiers, in accordance with embodiments of the present invention. At Event 202, a determination is made by a computing device processor that a customer interfacing with a first business platform application using a first platform-specific customer identifier is the same customer as a customer interfacing with a second business platform application using a second platform-specific customer identifier. For example, in the financial institution scenario, the customer may interface with an online banking platform using an online banking identifier and interface with an Interactive Voice Response (IVR) using a social security number.

The actual positive identification that a customer interfacing with a first business platform application using a first platform-specific customer identifier is the same customer as a customer interfacing with a second business platform application using a second platform-specific customer identifier may occur using any combination of algorithmic or heuristic computations. In one specific example, linking data is identified that links the first platform-specific customer identifier and the second platform-specific customer identifier. The linking data may be identified in the systems of record (SORs) of the first and second business platform applications, in a lookup table or elsewhere. Based on the linking data, one or more other systems of record (SORs) associated with other business platform applications are identified to positively identify the customer across the various business platforms applications implemented by the business entity.

In another specific example, the systems of record (SORs) associated with the first and second business platform applications are accessed based on the associated first and second application-specific customer identifiers. Data matches are identified between the data items in the first system of record and the data items in the second system of record. The data matches may include the same or similar data. For example, an address or telephone number with one different numeral or the like. Once the data matches have been determined, a weighting factor may be applied to the data item matches, such that the weighting factor applied to a data match is based on the degree of similarity of the data and a significance that that the data item match may indicate that the customer interfacing with the first business platform application is the same customer interfacing with the second business platform application. The weighted data matches are subsequently totaled and compared to a predetermined threshold value to determine if the customer interfacing with the first business platform application is the same customer interfacing with the second business platform application.

At Event 204 a federated customer identifier is generated for the customer based on the determination that the customer interfacing with the first business platform application is the same customer accessing the second business platform application. At Event 206 the federated customer identifier is stored in most, and in some instances all, of the systems of records associated with the customer and the various business platform applications implemented by the business entity. It should be noted that application of the federated customer identifier to the various systems of record (i.e., storing the identifier in the various systems of record (SORs)) requires that a determination be made that the customer is the same customer in each of the systems of record. Such a determination may occur prior to generating the federated customer identifier or, in alternate embodiments, after the federated customer identifier has been generated.

In optional embodiments the method may include collecting application activity data from a plurality of business applications. Each application activity datum indicates that a customer has interfaced with one of a plurality of business platform applications and may include a platform-specific customer identifier used by the customer in gaining access to the business platform application. In such embodiments of the method, the platform-specific customer identifiers in the application activity data may be the impetus (i.e., forms a basis) for determining that the customer interfacing with the first business platform application is the same customer interfacing with the second business platform application.

In still other optional embodiments the method may include implementing the federated customer identifier to access the plurality of systems of record to determine a plurality of platform-specific customer identifiers associated with the customer and identifying business associates that have previously interfaced with the customer or accounts associated with the customer based on the determined plurality of platform-specific customer identifiers.

Turning the reader's attention to FIG. 3, a flow diagram is presented of a method 300 for a method for generating federated customer identifiers, in accordance with embodiments if the present invention. At Event 302, activity data is collected from a plurality of business platform applications and, at Event 304, the activity data is mapped to determine the platform-specific customer identifier pertaining to the activity event.

At Event 306, once the platform-specific customer identifier has been identified and isolated, lookup of the customer identifier is performed on the corresponding system of record (SOR).

At Event 308, algorithmic and/or heuristic computations are performed to determine that the customer interfacing with one business platform application using a first platform identifier is, in fact, the same customer interfacing with another business platform application using a second customer identifier. In addition, determinations are made that the customer is the same customer in most, if not all, of the other business platform applications being monitored (i.e., from which activity data is collected). Once the determinations have been made, a federated customer identifier, otherwise referred to as a federated customer key, is generated for the customer.

At Event 312, the federated customer key is stored in most, and in some instances all, of the systems of record (SORs) that are associated with the customer and relate to business platform applications implemented by the business entity.

Referring to FIG. 4, a flow diagram is depicted of a method 400 generating a federated customer identifier, in accordance with embodiments of the present invention. At Event 402, information is collected from a plurality of systems of record, each system of record being associated with the customer and related to a business platform application. At Event 404, data matches are determined for same or similar data in the systems of record. Heuristics may be implemented to determine data matches for data that is similar but not the same.

At Event 406, each data match is weighted based on the similarity of the data comprising the match and the importance of the data in determining that the customer is the same customer. For example, a social security match would be highly significant in terms of positively identifying a customer, while an address or phone number may be less significant in terms of positively identifying a customer.

At Event 408, a total is calculated for the weighted data matches and, at Event 410, the weighted total of the data matches is compared to a predetermined threshold. If the weighted total meets or exceeds the threshold the customer is deemed to be the same customer that interfaced with one business platform application using a first customer identifier and interfaced with another business platform application using second customer identifier. At Event 412, based on the weighted total meeting or exceeding the predetermined threshold, a federated identifier/key is generated for the customer.

FIG. 5 is a schematic block diagram that illustrates architecture of a system 500 according to an exemplary embodiment of the present invention for monitoring application-related and/or platform-related activity in a distributed computing network. For example, employees/associates can perform application-related activities, such as accessing secure data using a Web interface via server 502. Other employees/associates can perform application-related activities, such as accessing secure data via a mainframe 504. For example, in the financial institution example, an associate/employee or the like can access an application to request loan history information via a mainframe 504. On the other hand, an associate/employee or the like can perform an application-related activity using a server 502, for example, using a Web site or any software application interacting with the server 502 accessing secure data. Thus, the application being executed at server 502 and/or mainframe 504 are monitored by activity monitoring module 118 through services such as Message Queuing (MQ), File Transfer Protocol (FTP), Web Services (W/S), file or the like, interacting with the activity monitoring staging database 530. The activity monitoring module 118 is configured to, among other functions, receive monitored activity data, parse the content of the data, apply business rules to the data, calculate hash values, and insert data into activity monitoring staging database 530, where the data may be persisted to disk at any step in case of system failure.

In accordance with the present invention each application may require that the associate/employee use an identifier, such as a user ID or the like to gain access to the application. Each of the applications may require that the associate enter an application-specific identifier, the application-specific identifier may be defined by the associate at the initial access or the application may be preconfigured to accept a specified associate identifier (e.g., employee number or the like). It should be noted that while the associate identifiers are deemed to be application-specific, the same associate identifier may apply to more than one domain/application. For example, in the financial institution example, an associate may use a condensed form of their name as the associate identifier to access both applications in the credit card and/or loan/mortgage domains.

In another example, customers can perform platform-related activities, such as performing online banking activities Web interface via server 502. Other employees/associates can perform platform-related activities, such interfacing with data via a mainframe 404. For example, in the financial institution example, a customer can access an application to request loan history information via a mainframe 504. Thus, the platform being accessed through server 502 and/or mainframe 504 are monitored by activity monitoring module 118 through services such as Message Queuing (MQ), File Transfer Protocol (FTP), Web Services (W/S), file or the like, interacting with the activity monitoring staging database 530. The activity monitoring module 118 is configured to, among other functions, receive monitored activity data, parse the content of the data, apply business rules to the data, calculate hash values, and insert data into activity monitoring staging database 530, where the data is persisted to disk.

In accordance with the present invention each platform may require that the customer use an identifier, such as a user ID or the like to gain access or interface with the platform. Each of the platforms requires that the customer enter a platform-specific identifier. The platform-specific identifier may be defined by the customer at the initial interface with the platform or the platform may be preconfigured to accept a specified customer identifier. It should be noted that while the customer identifiers are deemed to be platform-specific the same customer identifier may apply to more than one platform. For example, in the financial institution example, a customer may use their social security number as their customer identifier to interface with an Interactive Voice Response (IVR) platform, an online banking identifier as their customer identifier to interface with the online banking platform and the like.

Thereafter, data from the activity monitoring staging database 530 is processed and transferred to the activity monitoring reporting databases 532. The processing and transfer may include detecting for duplication processing 506 where duplicative information is flagged or deleted, and correlation 508 of rules for activities based upon events (using, for example, a correlation engine 510). According to exemplary implementations, additional processing can be performed upon storing in the activity monitoring reporting databases 532, including, but not limited to, determining activity outliers, statistical calculations for standard deviation and standard error 511 and providing reports 512 for application and business units 514, wherein detail access information is stored 516, information is aggregated into an OLAP (OnLine Analytical Process) cube 418, and finally the aggregated data and statistically calculated information is provided for reporting, cross-tabulation, and automated alerting 520.

FIG. 6 is a diagram showing general operation of a system for monitoring application-related and platform-related activity in a distributed computing network 600, according to an exemplary embodiment of the present invention.

As shown in FIG. 6, an exemplary system 620 monitors application-related activity and platform-related activity, such as access by associates to specified secure data and performance of specified activities and interfacing by customers with business platform applications in a distributed computing network 600. The system 620 includes a recorder 602 for recording information indicative of the occurrence of an application-related activity such as access to specified application-related data or performance of specified activities for a plurality employees/associates 608 performing the activities via one of the exemplary systems 610-616, such as laptop 610, server 612, workstation 614 and/or mainframe 616. In addition, recorder 602 can record information indicative of the occurrence of a platform-related activity such as interfacing by a customer 608 with a business platform application via one of the exemplary systems 610-616, such as laptop 610, server 612, workstation 614 and/or mainframe 616. The system provides a storage unit 622 for retaining monitored occurrences of application-related activities and/or platform-related activities and an analyzer 604 for analyzing the application-related activity and/or platform-related activities. Further, the system may include a notifier 610 for generating a real-time notification/alarm 606 and/or historical report(s) 624.

Thus, methods, apparatus, systems and computer program products described above positively determine that a customer interfacing with one business platform application using a platform-specific customer identifier is the same customer that is interfacing with another business platform application using another platform-specific customer identifier. Once the positive determination of same customer is made, a federated identifier key is generated and applied to all of the platforms, so as to globally identify the customer across multiple enterprise-wide platforms. As such, the present invention eliminates the labor-intensive need to manually analyze customer data to determine if a customer interfacing with one platform is the same customer interfacing with another platform.

While the foregoing disclosure discusses illustrative embodiments, it should be noted that various changes and modifications could be made herein without departing from the scope of the described aspects and/or embodiments as defined by the appended claims. Furthermore, although elements of the described aspects and/or embodiments may be described or claimed in the singular, the plural is contemplated unless limitation to the singular is explicitly stated. Additionally, all or a portion of any embodiment may be utilized with all or a portion of any other embodiment, unless stated otherwise.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A method for positively identifying customers accessing a business through multiple business platform applications using different customer identifiers, the method comprising:
   mapping, by a computing device processor, activity-related data associated with a first business platform application to determine a first platform-specific customer identifier used by a customer to access the first business platform application;
   mapping, by a computing device processor, activity-related data associated with a second business platform application to determine a second different platform-specific customer identifier used by the customer to access the second business platform application;
   determining, by a computing device processor, that the customer interfacing with the first business platform application using the first platform-specific customer identifier is the same as the customer interfacing with the second business platform application when using the second different platform-specific customer identifier, wherein the determination includes,
      accessing one or more lookup tables to determine (a) a first system of record associated with the first business platform application, (b) a first sequence of lookups to be performed on the first system of record, (c) a second system of record associated with the second business platform application, and (d) a second sequence of lookups to be performed on the second system of record,
      accessing the first system of record based on the first platform-specific identifier and performing the first sequence of lookups to identify first data items associated with the customer,
      accessing the second system of record based on the second platform-specific identifier and performing the second sequence of lookups to identify second data items associated with the customer,
      identifying one or more data item matches between the first data items in the first system of record and the second data items in the second system of record, wherein data item matches include same or similar data,
      applying a weighting factor to each of the one or more data item matches, wherein the weighting factor is based on (a) similarity of the data and (b) a significance that the data item match may indicate that the customer interfacing with the first business platform application is the same customer interfacing with the second business platform application, and
      calculating a total for the weighted one or more data item matches and comparing, the calculated total for the weighted one or more data item matches to a predetermined threshold to determine if the customer interfacing with the first business platform application is the same customer interfacing with the second business platform application;
   generating, by a computing device processor, a different and unique federated identifier for the customer based on the determination that the customer interfacing with the first business platform application is the same as the customer interfacing with the second business platform application; and
   storing, in computing device memory, the federated identifier for the customer in a plurality of systems of record, wherein each system of record is associated (a) with the customer and (b) with a business platform application provided by the business.

2. The method of claim 1, further comprising collecting, at a computing device, customer activity data from a plurality of business interface platforms, wherein each customer activity datum indicates that a customer has conducted an activity with one of a plurality of business platform applications and includes a platform-specific customer identifier that is associated with the customer and used to conduct the activity.

3. The method of claim 2, wherein the platform-specific customer identifiers in the customer activity data is an impetus for determining that the customer interfacing with the first business platform application is the same as the customer interfacing with the second business platform application.

4. The method of claim 1, wherein determining further comprises:
   identifying, by a computing device processor, linking data that links the first platform-specific customer identifier and the second platform-specific customer identifier; and
   accessing, by a computing device processor, one or more systems of record associated with business platform applications based on the linking data to determine that the customer interfacing with the first business platform application is the same as the customer interfacing with the second business platform application.

5. The method of claim 1, further comprising implementing, by a computing device processor, the federated identifier to access the plurality of systems of record to determine a plurality of platform-specific customer identifiers associated with the customer.

6. The method of claim 5, further comprising identifying, by a computing device processor, business associates that have previously interfaced with the customer or accounts associated with the customer based on the determined plurality of platform-specific customer identifiers.

7. An apparatus for positively identifying customers accessing a business through multiple business platform applications using different customer identifiers, the apparatus comprising:

a computing platform including one or more processors and a memory in communication with the processor;
a customer federation module stored in the memory, executable by at least one of the processors and configured to:
  map activity-related data associated with a first business platform application to determine a first platform-specific customer identifier used by a customer to access the first business platform application;
  map activity-related data associated with a second business platform application to determine a second different platform-specific customer identifier used by the customer to access the second business platform application;
  determine that the customer interfacing with the first business platform application using the first platform-specific customer identifier is the same as the customer interfacing with the second business platform application when using the second different platform-specific customer identifier by:
    accessing one or more lookup tables to determine (a) a first system of record associated with the first business platform application, (b) a first sequence of lookups to be performed on the first system of record, (c) a second system of record associated with the second business platform application, and (d) a second sequence of lookups to be performed on the second system of record,
    accessing the first and second system of record based on the first and second platform-specific identifiers and performing the first and second sequence of lookups to identify first data items associated with the customer and second data items associated with the customer,
    identifying one or more data item matches between the first data items in the first system of record and the second data items in the second system of record, wherein data item matches include same or similar data,
    applying a weighting factor to each of the one or more data item matches, wherein the weighting factor is based on (a) similarity of the data and (b) a significance that the data item match may indicate that the customer interfacing with the first business platform application is the same customer interfacing with the second business platform application, and
    calculating a total for the weighted one or more data item matches and comparing the calculated total for the weighted one or more data item matches to a predetermined threshold to determine if the customer interfacing with the first business platform application is the same customer interfacing with the second business platform application, and,
    based on the determination, generate a different and unique federated identifier for the customer; and
a plurality of systems of record stored in the memory, each system of record is associated (a) with the customer and (b) with a business platform application provided by the business and configured to receive and store the federated identifier.

8. The apparatus of claim 7, further comprising an activity monitoring module stored in the memory, executable by the processor and configured to monitor and collect customer activity data from a plurality of business interface platforms, wherein each customer activity datum indicates that a customer has conducted an activity with one of a plurality of business platform applications and includes a platform-specific customer identifier that is associated with the customer and used to conduct the activity.

9. The apparatus of claim 8, wherein the customer activity data collected by the activity monitoring module is an impetus for determining that the customer interfacing with the first business platform application is the same as the customer interfacing with the second business platform application.

10. The apparatus of claim 7, wherein the customer federation module is further configured to identify linking data that links the first platform-specific customer identifier and the second platform-specific customer identifier and access one or more systems of record associated with business platform applications based on the linking data to determine that the customer interfacing with the first business platform application is the same as the customer interfacing with the second business platform application.

11. The apparatus of claim 7, further comprising an associate-customer connection module stored in the memory, executable by the processor and configured to implement the federated identifier to access the plurality of systems of record to determine a plurality of platform-specific customer identifiers associated with the customer.

12. The apparatus of claim 11, wherein the associate-customer connection module is further configured to identify business associates that have previously interfaced with the customer or accounts associated with the customer based on the determined plurality of platform-specific customer identifiers.

13. A computer program product including a non-transitory computer-readable medium, the medium comprising:
  a first set of codes for causing a computer to:
    map activity-related data associated with a first business platform application to determine a first platform-specific customer identifier used by a customer to access the first business platform application,
    map activity-related data associated with a second business platform application to determine a second different platform-specific customer identifier used by the customer to access the second business platform application,
    determine that the customer interfacing with the first business platform application using the first platform-specific customer identifier is the same as the customer interfacing with the second business platform application when using the second different platform-specific customer identifier by
      (1) accessing one or more lookup tables to determine (a) a first system of record associated with the first business platform application, (b) a first sequence of lookups to be performed on the first system of record, (c) a second system of record associated with the second business platform application, and (d) a second sequence of lookups to be performed on the second system of record,
      (2) accessing the first and second system of record based on the first and second platform-specific identifiers and performing the first and second sequence of lookups to identify first data items associated with the customer and second data items associated with the customer,
      (3) identifying one or more data item matches between the first data items in the first system of record and the second data items in the second system of record, wherein data item matches include same or similar data,
      (4) applying a weighting factor to each of the one or more data item matches, wherein the weighting factor is based on similarity of the data and a significance that the data item match may indicate that the customer interfacing with the first business platform application is the same customer interfacing with the second business platform application, and (5) calculating a total for the weighted one or more data item matches and comparing the calculated total for the weighted one or more data item matches to a predetermined threshold to determine if the customer interfacing with the first business platform application is the same customer interfacing with the second business platform application;

a second set of codes for causing a computer to generate a different and unique federated identifier for the customer based on the determination that the customer interfacing with the first business platform application is the same customer interfacing with the second business platform application; and a third set of codes for causing a computer to store the federated identifier for the customer in a plurality of systems of record, wherein each system of record is associated with the customer and with a business platform application provided by the business.

14. The computer program product of claim 13, further comprising a fourth set of instructions for causing a computer to collect customer activity data from a plurality of business interface platforms, wherein each customer activity datum indicates that a customer has conducted an activity with one of a plurality of business platform applications and includes a platform-specific customer identifier that is associated with the customer and used to conduct the activity.

15. The computer program product of claim 14, wherein the platform-specific customer identifiers in the customer activity data collected by the fourth set of instructions in an impetus for the first set of instructions to determine that the customer interfacing with the first business platform application is the same as the customer interfacing with the second business platform application.

16. The computer program product of claim 13, wherein the first set of codes are further configured to cause the computer to identify linking data that links the first platform-specific customer identifier and the second platform-specific customer identifier and access one or more systems of record associated with business platform applications based on the linking data to determine that the customer interfacing with the first business platform application is the same as the customer interfacing with the second business platform application.

17. The computer program product of claim 14, further comprising a fourth set of codes for causing a computer to implement the federated identifier to access the plurality of systems of record to determine a plurality of platform-specific customer identifiers associated with the customer.

18. The computer program product of claim 17, further comprising a fifth set of codes for causing a computer to identify business associates that have previously interfaced with the customer or accounts associated with the customer based on the determined plurality of platform-specific customer identifiers.

* * * * *